Figure 1A:
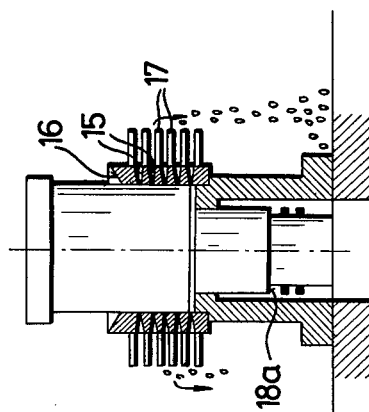

United States Patent

Tatai et al.

[11] Patent Number: 4,474,334
[45] Date of Patent: Oct. 2, 1984

[54] PROCESS AND EQUIPMENT FOR THE CRUSHING OF SCRAP RUBBER, PARTICULARLY SCRAP TYPE

[75] Inventors: Ilona Tatai; Gusztáv Gundisch; Géza Szöts; Elemér Lantos, all of Budapest, Hungary

[73] Assignee: Taurus Gumiipari Vallalat, Budapest, Hungary

[21] Appl. No.: 438,475

[22] Filed: Nov. 2, 1982

Related U.S. Application Data

[63] Continuation of Ser. No. 145,705, May 1, 1980, abandoned.

[30] Foreign Application Priority Data

May 7, 1979 [HU] Hungary .............. TA 1519

[51] Int. Cl.³ .............................................. B02C 19/12
[52] U.S. Cl. .......................................... 241/1; 241/95; 241/301; 241/DIG. 31
[58] Field of Search ............... 241/DIG. 31, 301, 95, 241/85, 93, 235, 236, 227, 273.4, 273.2, 1, 273.3, 30; 425/382 R, 376 R, 464, 381; 72/261, 273; 264/36, 37

[56] References Cited

U.S. PATENT DOCUMENTS

| | | | |
|---|---|---|---|
| 909,133 | 1/1909 | Baur | 241/85 |
| 1,007,016 | 10/1911 | Weir | 241/74 X |
| 1,133,952 | 3/1915 | Gare | 241/DIG. 31 |
| 1,224,134 | 5/1917 | Burford | 241/95 X |
| 1,537,163 | 5/1925 | Giunta et al. | 241/236 X |
| 2,813,300 | 11/1957 | Hausman | 425/376 R X |
| 2,833,481 | 5/1958 | Perks | 241/85 X |
| 3,021,254 | 2/1962 | Helversen et al. | 425/381 X |
| 4,000,232 | 12/1976 | Klaeysen et al. | 264/37 X |
| 4,050,637 | 9/1977 | Eirich et al. | |
| 4,177,234 | 12/1979 | Lowry | 264/141 X |

FOREIGN PATENT DOCUMENTS

| | | |
|---|---|---|
| 2312753 | 8/1975 | Fed. Rep. of Germany . |
| 2503621 | 9/1976 | Fed. Rep. of Germany . |
| 2521486 | 11/1976 | Fed. Rep. of Germany . |
| 2278399 | 2/1976 | France . |

Primary Examiner—Mark Rosenbaum

[57] ABSTRACT

This invention relates to a process and equipment for the crushing of scrap rubber, particularly scrap tire. According to the invention the scrap rubber is forced through small-size openings under a pressure producing the cold yield of the rubber.

5 Claims, 26 Drawing Figures

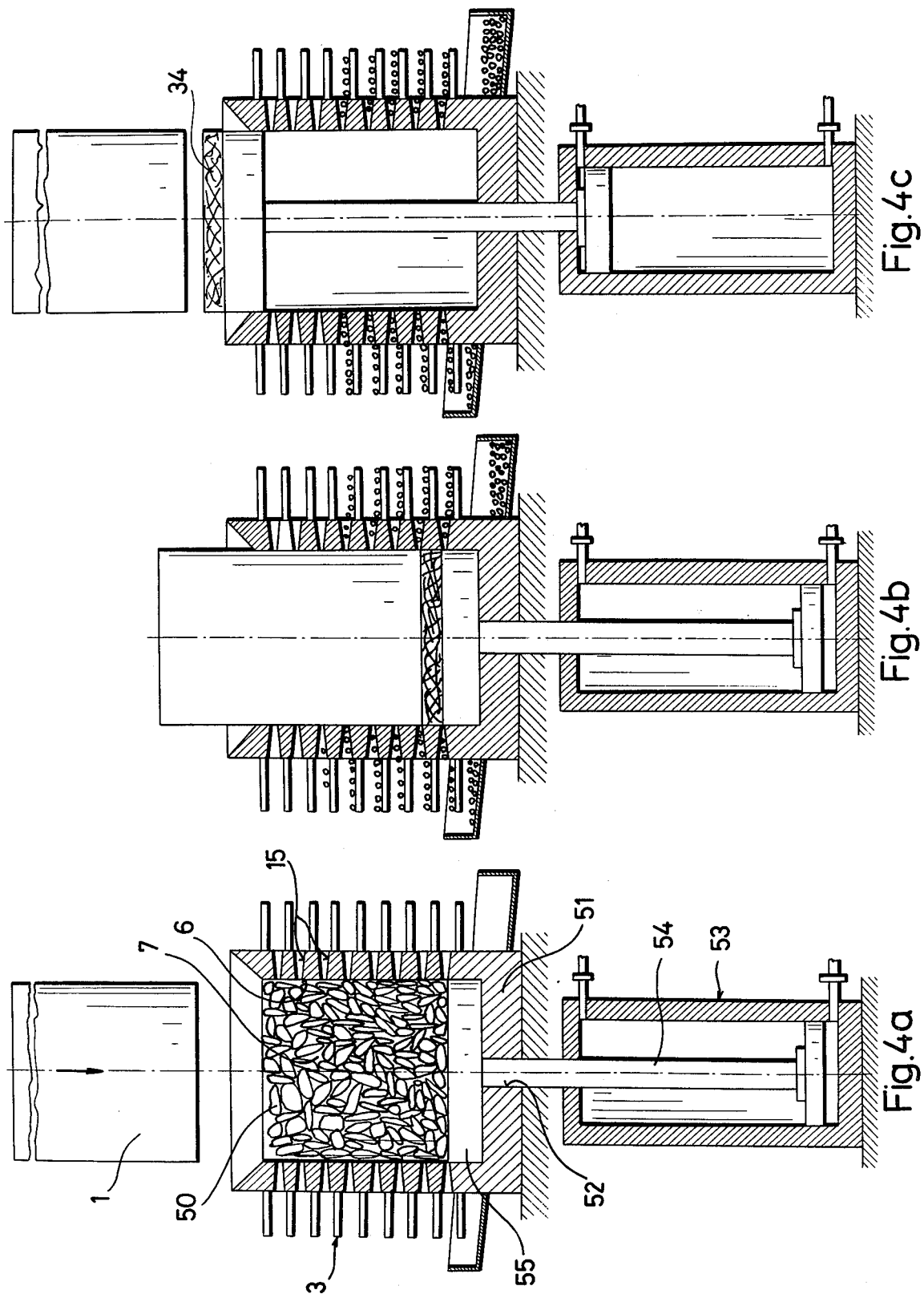

PROCESS AND EQUIPMENT FOR THE CRUSHING OF SCRAP RUBBER, PARTICULARLY SCRAP TYPE

This is a continuation of application Ser. No. 145,706, filed May 1, 1980, now abandoned.

The invention relates to the crushing of scrap rubber, mainly scrap tire and to an equipment for implementation of the process.

It is generally known that the accumulation of worn out, fabric and/or steel reinforced tires and other semicured or cured scrap rubber represent an ever-increasing problem all over the world. Their reprocessing would be highly desirable, and several attempts have been made for this purpose.

Such proposals are described for instance in the GFR patent specification No. 2 503 621 and USA Pat. No. 4,050,637. Accordingly the scrap rubber is crushed mechanically, mostly by grinding, using roller mill, hammer mill, rotary grinding equipment or crushing extruder. According to the French patent specification No. 2 278 399 grinding of the scrap rubber is carried out at high pressure.

Above proposals have a common deficiency in so far as they are energy-intensive, since as a result of the high friction arising during crushing, the scrap rubber heats up intensively. Consequently a large part of the energy input is converted to heat due to friction, hence the crushing will be ineffective. Furthermore these devices are expensive.

In the GFR patent specification No. 2 312 753 such solution is described, in which to improve the efficiency of the mechanical crushing, the scrap rubber is deep frozen prior to crushing. However this proposal requires even higher input.

Further deficiency of the known crushing proposals is that the possibly present metal parts have to be removed in advance from the scrap rubber. Thus for instance the steel bead wires have to be removed from the tires, thus further increasing the cost. In addition, the tires free of bead wire have to be cut up.

The invention is aimed at elimination of above deficiencies.

Accordingly the task to be solved with the invention is to bring about a solution for the crushing of scrap rubber, mainly scrap tire, which enables efficient and economical crushing at low cost.

The invention is based on the recognition, that the task will be solved if the scrap rubber is forced through small-size openings under a pressure producing the cold yield of the rubber. This way the friction leading to undesirable loss of energy and the accompanying heat development can be nearly completely eliminated. The bond between the thread-molecules of the rubber forced through the openings breaks up. The thread-molecules are unable to follow the shape of the opening, due to the sudden expansion following the high pressure, thus they break off, and become fragmentary.

The task of crushing scrap rubber, mainly scrap tire is solved with such process, in which the crushing is carried out by placing the scrap rubber under pressure causing the cold yield of the rubber, and this way forcing it through the openings, the rubber is expanded.

The process according to the invention can be implemented with such equipment, which has a pressure chamber to receive the scrap rubber to be crushed, and to produce the pressure causing the cold yield of the rubber. At least one opening is leading into the pressure chamber, the inlet cross section of which is selected according to the required crushing grain size.

The crushing grain size is determined by the cross section of the opening, i.e. the maximal grain size is nearly identical with the dimension of the opening. There is a close relationship between the size of the opening or openings and pressure; the cold yield through smaller openings requires higher pressure, while in case of large-size openings lower pressure will be required. Thus the size of the openings is to be selected in accordance with the utilization of the product obtained with crushing according to the invention.

The solution according to the invention is applicable even when the scrap rubber contains metal- and/or fabric reinforcement. The metal reinforcement, e.g. the steel beads of the tires need not be removed in advance. In respect of the steel reinforcement the openings serve as filters at the same time. The fabric reinforcement of the scrap rubber represent no problem, because as a result of the pressure, the fabric reinforcement breaks up and crumbles.

Figure 5A:
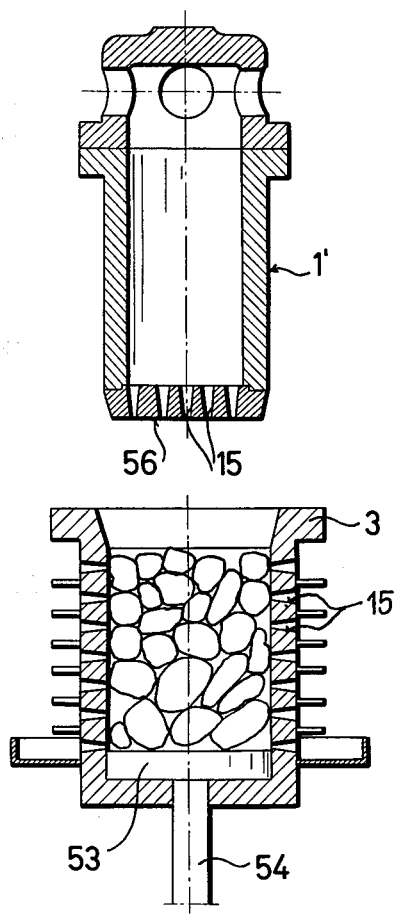
Figure 5B:
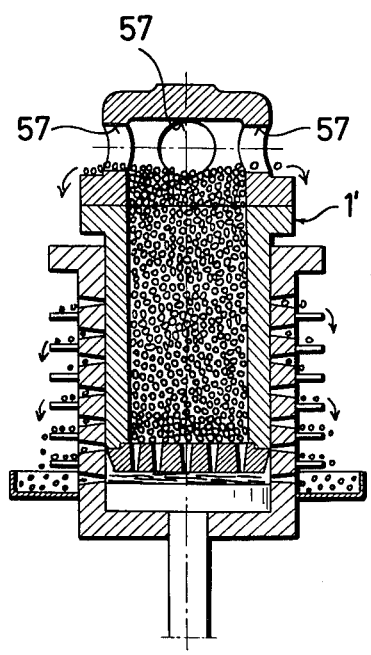
Figure 6A:
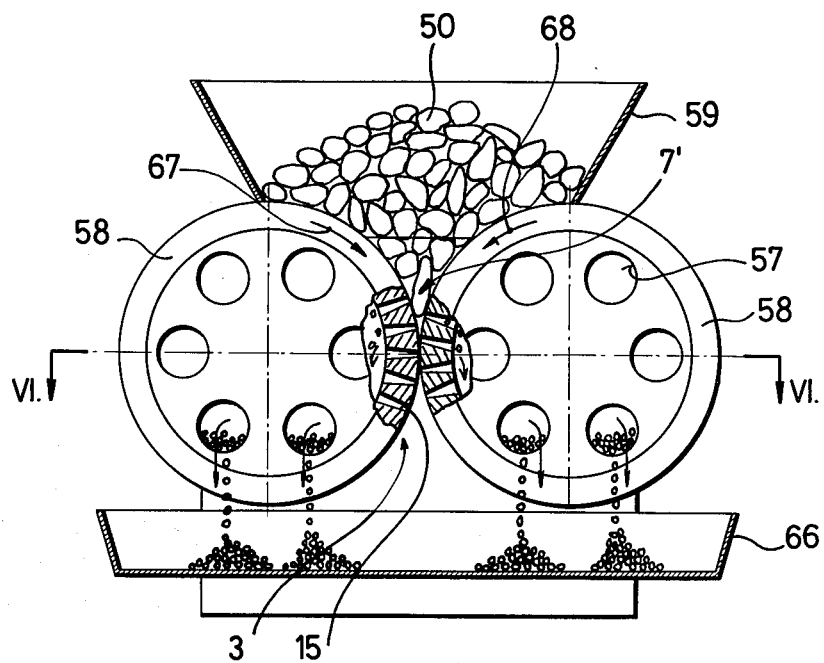
Figure 6B:
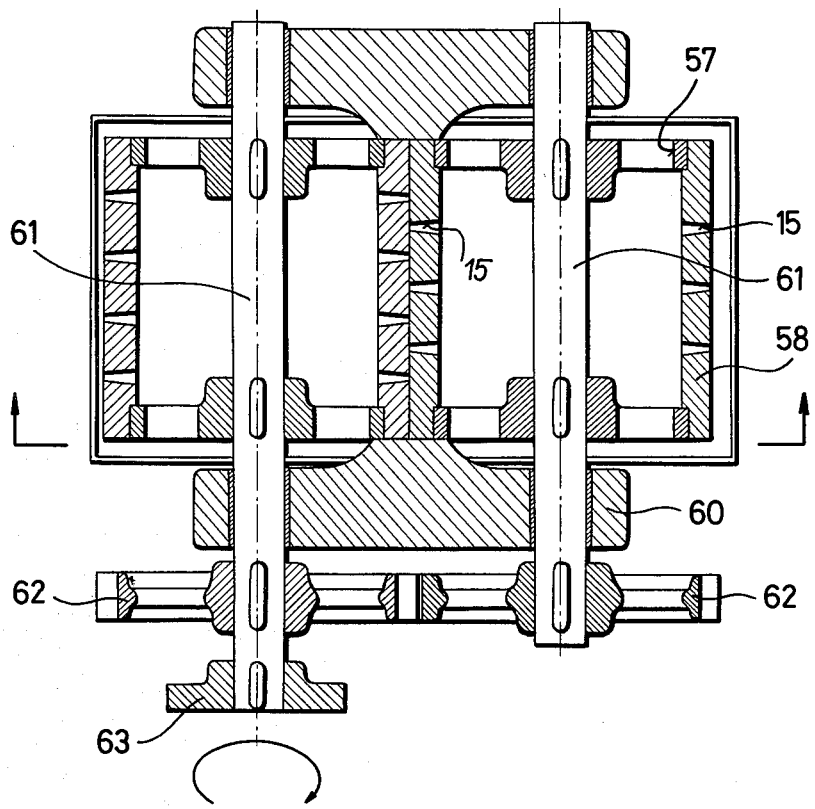

The invention is described in detail with the aid of the enclosed drawings, showing some examples of the embodiment of the rubber crushing equipment according to the invention, as follows:

FIGS. 1a–1d: Longitudinal section showing the various operative positions of the embodiment of the rubber crushing equipment according to the invention;

FIGS. 2a–2e: Longitudinal section showing the various operative positions of the second embodiment of the equipment according to the invention;

FIGS. 3a–3i: Longitudinal section showing the various operative positions of the third embodiment of the equipment according to the invention;

FIGS. 4a–4c: Longitudinal section showing the various operative positions of the fourth embodiment of the equipment according to the invention;

FIGS. 5a–5b: showing an alternative of the equipment according to FIGS. 4a–4c;

FIGS. 6a–6b: further embodiment of the equipment according to the invention where FIG. 6a is the side view, and FIG. 6b is the section along line VI—VI shown in FIG. 6a.

Figure 7:
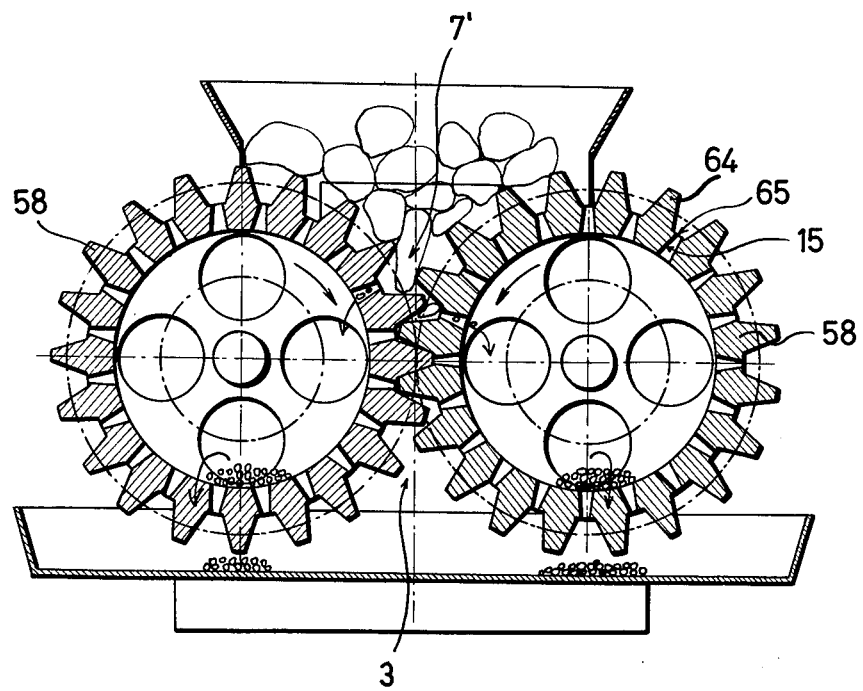

FIG. 7: Vertical section showing an alternative of the equipment according to FIGS. 6a and 6b.

The similar details are shown with the same reference numbers on the drawings.

The embodiment shown in FIGS. 1a–1d was developed from a conventional hydraulic press. This is suitable for the crushing of tires. The equipment has a stamp 1 and a bottom stamp 2. The stamp 1 is fixed to a piston rod of a conventional double-acting hydraulic working cylinder 4, whereby it moves up and down. The stamp 1 functions with a tool 3 arranged on the bottom stamp 2 according to the invention. The working cylinder 4 is connected to the conventional hydraulic supply unit (not illustrated).

The equipment according to the invention has a pressure chamber to receive the scrap rubber and to bring about the pressure necessary for the cold yield of the rubber with at least one opening leading into the pressure chamber. In this embodiment the pressure chamber is formed as an annular space between the stamp 1 and a cylindrical internal mantle surface 6 of the tool 3 in the lowered position of the stamp 1 shown in FIG. 1c, the pressure chamber being marked with reference number 7. At further lowering of the stamp 1, the pressure chamber 7 is sealed by a shoulder 8 of stamp 1 at the top, and by an end-surface 10 of a supporting element 9 of the tool 3. Here the supporting element 8 is screwed to the bottom stamp 2, provided with seat 11 on the upper end-surface 10 for the tool 3. The supporting element 9 has a central hole 12 in the seat 11 with a tightly fitted cylinder 13 of the stamp 1 sliding in it. In this embodiment the supporting element 9 has a cylindrical space 14, with hole 12 leading into it. Diameter of the shoulder 8 of the stamp 1 is selected in such a way that the stamp 1 should slide on the mantle of the tool with a tight fit.

The tool 3 is provided with several openings 15 in this case. These are radial holes conically expanding outwards. Diameter of the openings 15 is selected to be 5 mm. An inlet cone 16 is formed on the upper part of the tool 3 provided with curbs 17 on the external mantle (FIG. 1d).

On the cylinder 13 of stamp 1 a shoulder 18 is formed with a small diameter cylinder 19 of the stamp 1 underneath. The upper edge of hole 12 of the supporting element 9 is formed as a cutting edge 12a in this case, co-acting with the edge of shoulder 18 formed as a cutting edge 18a (FIGS. 1a and 1b).

Figure 1B:
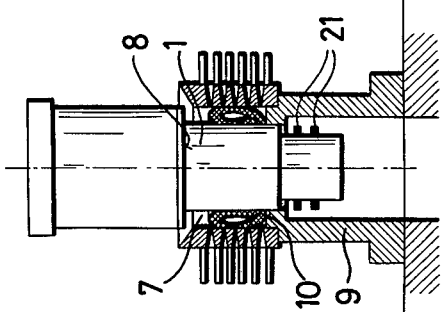
Figure 1C:
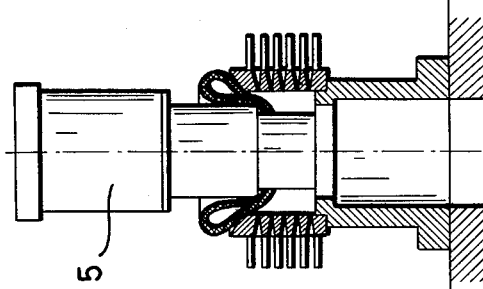
Figure 1D:
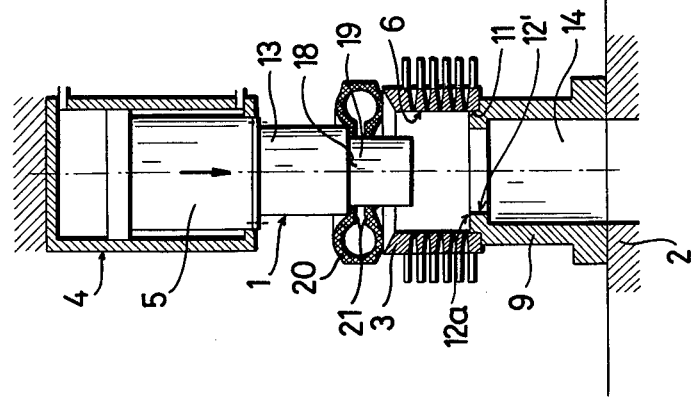

Operation of the equipment according to FIGS. 1a–1d is the following: Fabric reinforced tire 20 of suitable bead size is placed between the stamp 1 and tool 3. By actuation of the hydraulic working cylinder 4, the stamp 1 is lowered into the position shown in FIG. 1a, in which the cylinder 19 of stamp 1 is lowered into the central hole of the tire 20, while the shoulder 18 bears up in the upper base ring 21 of the tire 20. Since steel wire is in the base ring 21 to which the fabric frame is fixed ensuring the strength of the tire, when the stamp 1 is lowered the tire 20 is deformed by the shoulder 18 and pulled in by the base rings 21 into the pressure chamber 7 formed in the tool 3 (FIG. 1b).

After pulling in the tire 20 the cutting edges 12a and 18a shear off the two base rings 21 of the tire 20, said base rings falling off the cylinder 19 of stamp 1 through the space 14 of the supporting element 9 (FIG. 1c).

At further lowering of the stamp 1 a pressure is applied in the pressure chamber 7 to bring about the cold yield of the tire 20. As a result of this the rubber yields and the fabric reinforcement breaks up and pass out of the pressure chamber 7 in crumbly condition through the openings 15. The applied yield pressure varies according to the cross section and number of the openings 15 as well as according to the cross section of the pressure chamber 7. In the course of the experiments the yield pressure was selected to be 25,000 N/cm$^2$. (35,700 psi). After completion of the crushing process the stamp 1 is lifted to its upper end-position with the working cylinder and following the admission of the next tire to be crushed, the crushing cycle is repeated.

The embodiment of the equipment according to the invention shown in FIGS. 2a–2e, or FIGS. 3a–3i is suitable for the crushing of steel radial tires.

Figures 2A, 2C:
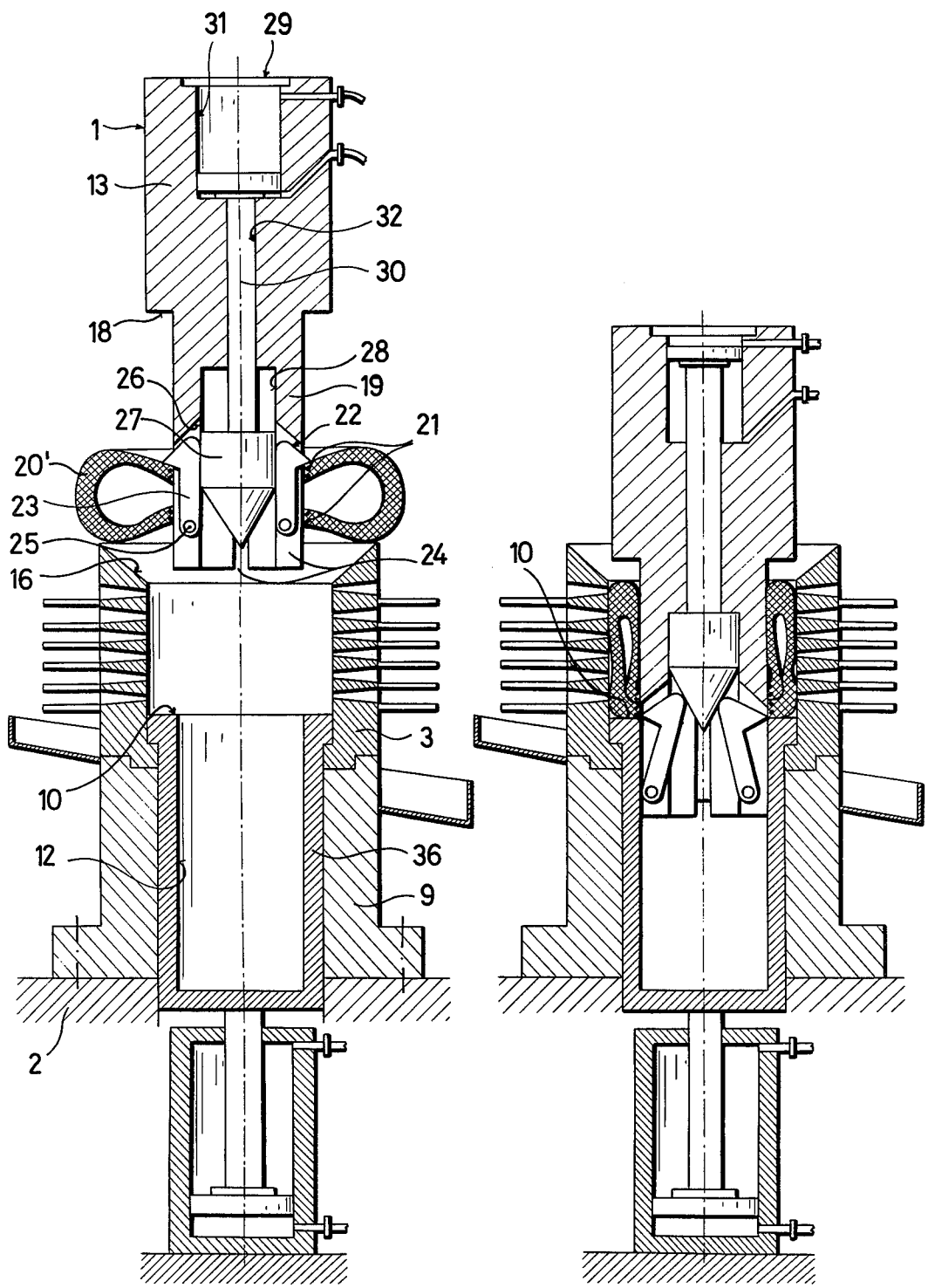

Operation of the equipment according to FIGS. 2a–2e is essentially the same as that of the solution given in FIGS. 1c–1d, hence the hydraulic cylinder actuating the stamp 1 up and down is not illustrated. The difference is, that the whole tire is placed under yield pressure in the pressure chamber with the equipment, without removal of the base rings. As it is shown in FIG. 2a, the equipment is provided with a tire pulling device 22. The tire pulling device has four claws 23, arranged tiltably in vertical direction around pins 25 in radial grooves 24 formed in the cylinder 19 of the stamp 1. FIG. 2a shows that tilting of the claws 23 outwards is limited by a slanting surface 26 of grooves 24. The claws 23 coact internally with a tip 27 slidably arranged in a central hole 28 of the cylinder 19. The tip 27 is connected with a piston rod 30 of a double-acting hydraulic working cylinder 29 for the up- and down movement in the hole 28. Cylinder 31 of the working cylinder 29 is arranged in the cylinder 13 of said stamp 1 and a piston rod 30 is guided in a central longitudinal hole 32 of stamp 1. The working cylinder 29 is connected to the hydraulic supply unit of the equipment, not shown separately.

Figure 2B:
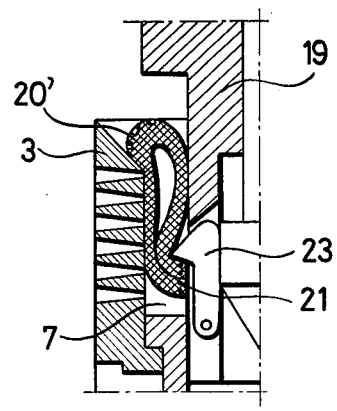
Figures 2D, 2E:
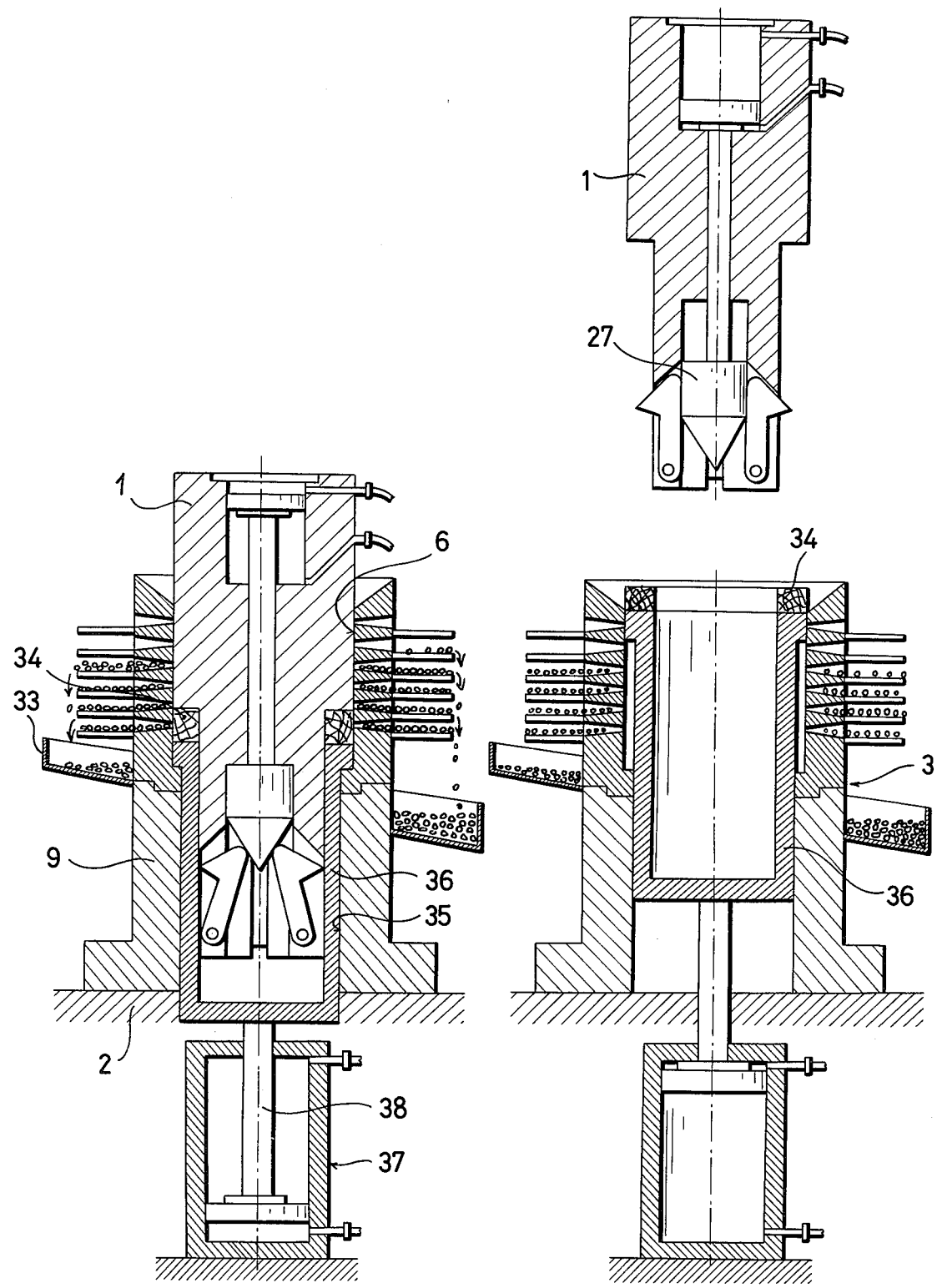

In the position shown in FIG. 2a, the claws 23 protrude from the cylinder mantle 19 clamping the upper base rings 21 of the steel radial tire. The claws 23 are forced into this position by tip 27 being in its lower position in this case. FIG. 2b illustrates in detail that at lowering of the stamp 1, the tire 20 is deformed by the base rings with claws 23, and pulled into the pressure chamber 7. Then the tip 27 is lifted by the working cylinder 29 (FIG. 2c). At the further lowering of stamp 1 the claws 23 impact the end surface 10 turning into the grooves 24 (FIGS. 2c and 2d). With further lowering of the stamp 1 the crushing itself is carried out as described above (FIG. 2e). Here the openings 15 are similarly 5 mm diameter tapered holes expanding outwards. The yield pressure was selected to be 20,000 N/cm$^2$ (28,300 psi). The crumb rubber coming out of the openings 15 fall onto a sloping tray 33 (FIG. 2d).

In the next step the stamp 1 is lifted and tip 27 with the working cylinder 29 is lowered into its lower position. At the same time a remnant 34 of the tire 20' containing also the steel reinforcement compressed to a ring, is removed from the pressure chamber 7 with an ejecting bush 36 slidable on the mantle of the tool 3 and in the supporting element 9 (FIG. 2e). The ejecting bush 36 is fixed to a piston rod 38 of a double-acting hydraulic working cylinder 37 (FIG. 2d). FIG. 2a illustrates that the end surface 10 surrounding the pressure chamber 7 is the end surface of the ejecting bush 36. The working cylinder 37 is connected to the hydraulic supply unit of the equipment (not shown).

In a preferable embodiment of the equipment according to the invention shown in FIGS. 3a–3i the torus shaped steel radial tire 20' is deformed to a roll for crushing (FIGS. 3d–3g), in contrast with the solution shown in FIG. 2c, where the thickness of the rubber layer in the pressure chamber 7 is at least twice as much as that of the tire. By deformation to a roll the yield crushing force is reducible in proportion of the compressed cross sections.

Figure 3C:
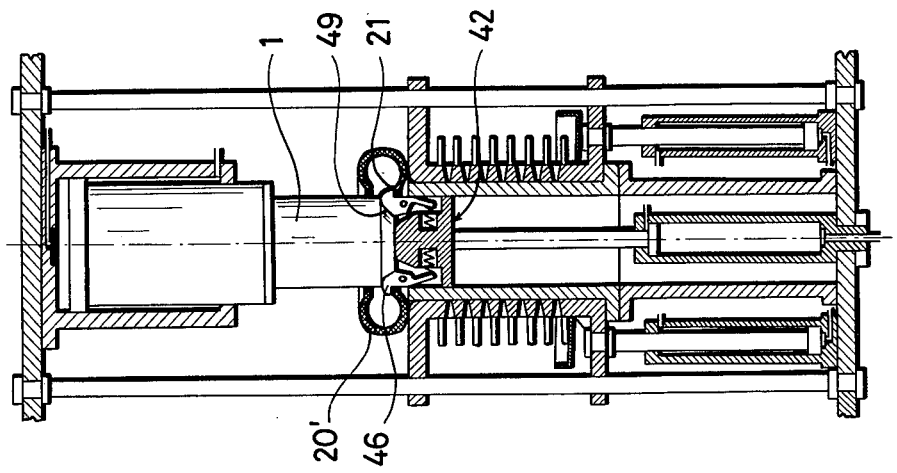
Figure 3B:
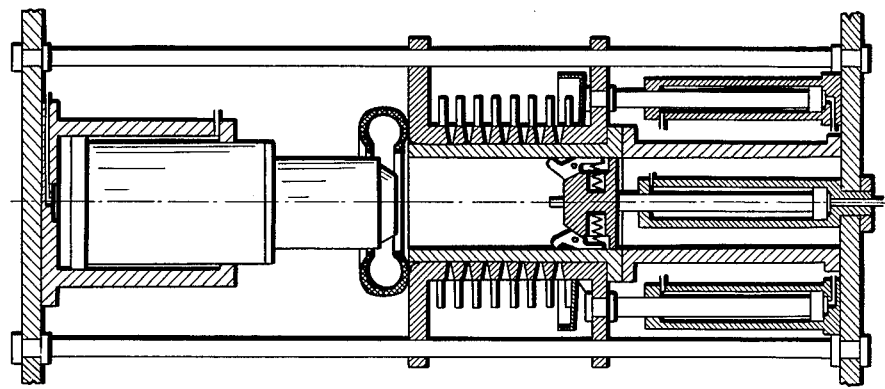
Figure 3A:
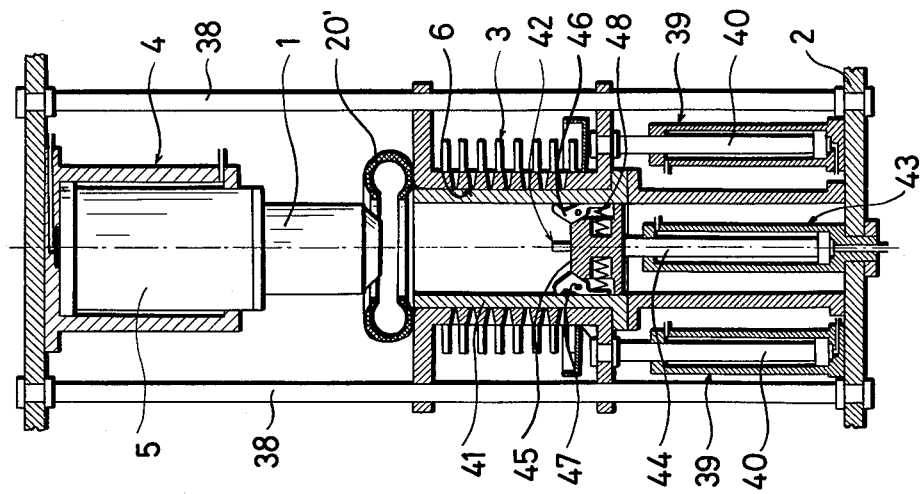
Figure 3F:
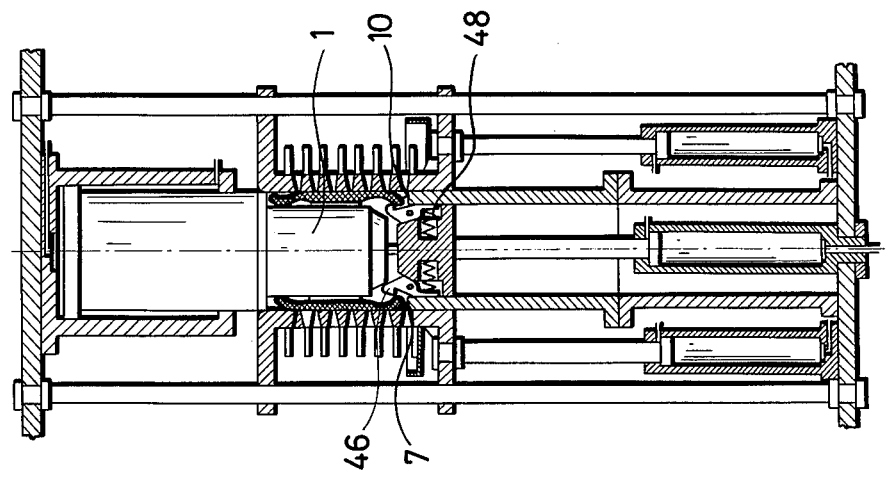

Here the tool 3 is arranged on vertical ducts 38 with piston rods 40 of double-acting hydraulic working cylinders 39 slidable in vertical direction. Meanwhile the internal mantle 6 slides on the external mantle of a fixed supporting tube 41 (FIG. 3a). The upper side of the supporting tube 41 forms the end-surface 10 surrounding the pressure chamber 7 from underneath in this embodiment (FIG. 3f).

A tire pulling device 42 is arranged in the fixed supporting tube 41. This has a head 45 slidable up- and down in the supporting tube 41 with a piston rod 44 of a double-acting hydraulic working cylinder 43 (FIG. 3a). The head 45 is provided with four claws 46 tiltably arranged around pins 47. The claws 46 are forced into closed position by compression springs 48. A truncated cone 49 is formed at the end of stamp 1, to force apart the claws 46 into the position for clamping the base ring 21 of the tire 20' as shown in FIG. 3c.

The equipment according to FIGS. 3a–3i functions as follows:

The tool 3 with the working cylinders 39 are brought into lower position, while the stamp 1 with the working cylinder 4 into the upper position. In the next step steel radial tire 20' is placed between the tool 3 and stamp 1 (FIG. 3a). This is followed by lowering the stamp 1 into the position shown in FIG. 3b, then the head 45 of the tire pulling device 42 is lifted into the position shown in FIG. 3c by actuation of the working cylinder 43. The truncated cone 49 of the stamp 1 forces the claws 46 apart, while they clamp the lower base ring 21 of the tire 20'.

Figure 3E:
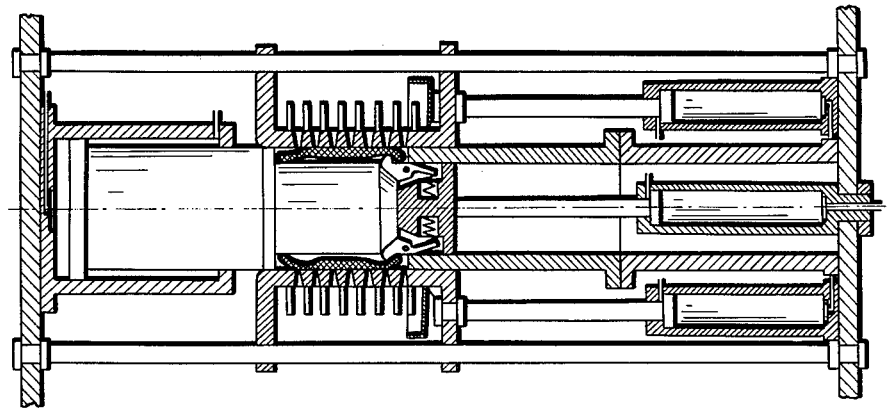
Figure 3D:
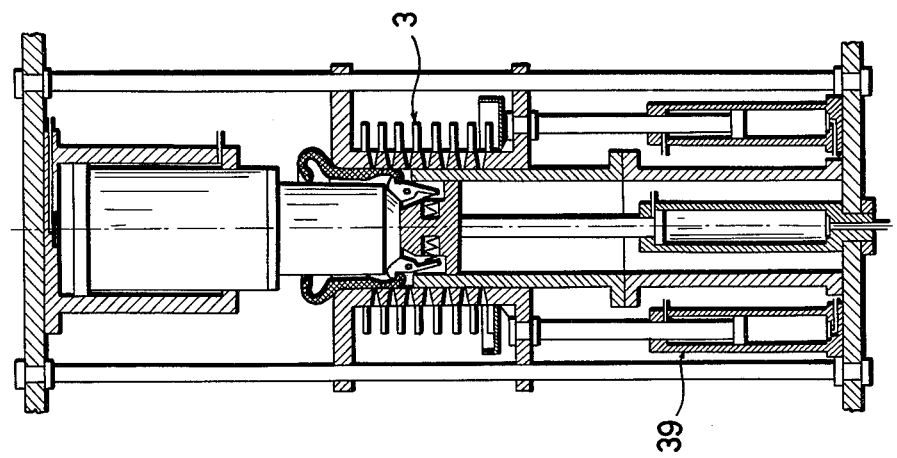

With actuation of the working cylinders 39 the tool 3 is pushed upwards, meanwhile the tire 20' is gradually deformed to a roll (FIGS. 3d and 3e). FIG. 3f shows the operative position, when the stamp 1 is slightly lifted. This is necessary for closing the claws 46 by the compression springs 48 and at the same time the claws 46 release the lower base ring 21 of the tire 20'.

Figure 3I:
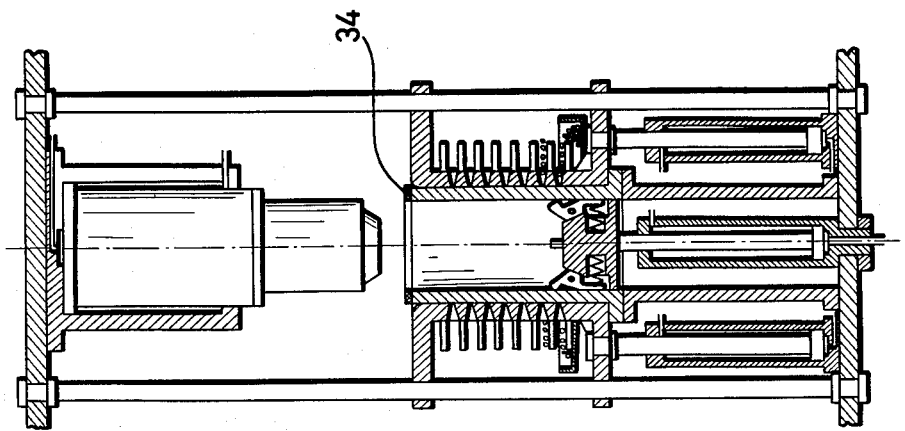
Figure 3H:
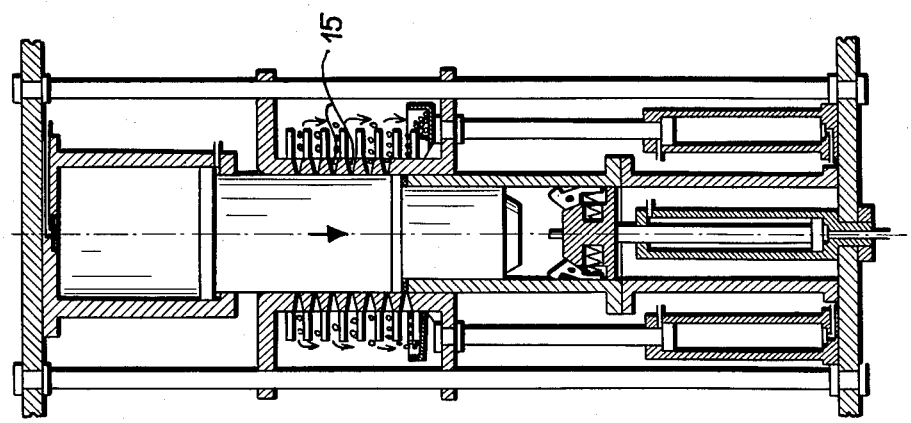
Figure 3G:
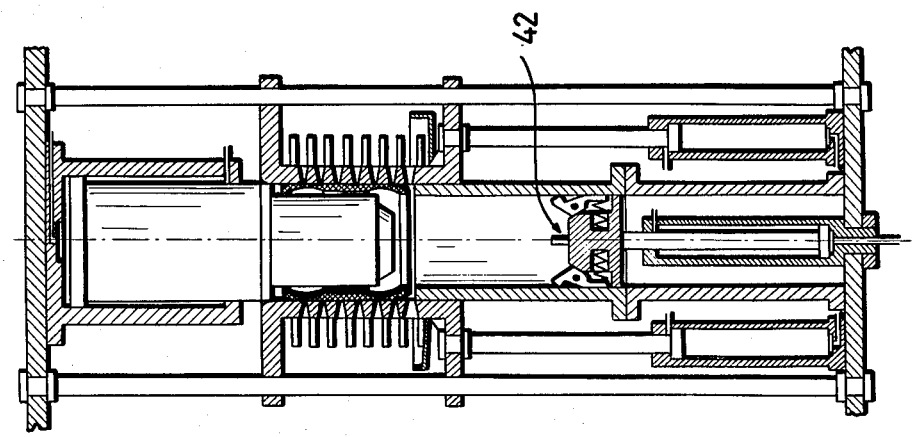

As the next step the head 45 of the tire pulling device 42 is lowered into its lower position, then the crushing is carried out by pressing down the stamp 1 as described earlier (FIGS. 3g and 3h). Then the stamp 1 is lifted into its upper end-position, while the tool 3 is lowered into its lower position. This way the remnant 34 including the steel reinforcement pressed into a ring will become accessible (FIG. 3i). Here the same openings 15 were used as before, and a yield pressure of 20,000 N/cm$^2$ (28,300 psi).

FIGS. 4a–4c illustrate a further embodiment of the equipment according to the invention suitable for the crushing of any lumpy, e.g. semi-cured or cured scrap rubber or raw rubber. Here scrap rubber 50 to be crushed is placed into the cylindrical pressure chamber 7 of the tool 3 formed as an oblong vessel. Then the stamp 1 is moved downward as described earlier, while the crushing is carried out as before. In the course of the experiments 5 mm diameter openings 15 and 9000 N/cm$^2$ (12,800 psi) pressure were used also in this construction for the continuous crushing of the semi-cured scrap rubber, when not crumbly, but "earthworm"-like product was obtained.

A piston rod 54 of a double-acting hydraulic working cylinder 53 is guided in a central hole 52 of a bottom plate 51 of the tool 3, connected to an other piston 55 at its free end. In this embodiment the piston 55 surrounds the pressure chamber 7 from underneath and it is slidable upwards on the internal cylindrical mantle 6 of the tool 3. At the end of the crushing process the remnant 34 pressed to a disc shape is removed from the pressure chamber 7 with the aid of piston 55 lifted with the working cylinder 53. Also in this solution the openings 15 are radial holes made on the mantle of the tool 3.

FIGS. 5a and 5b show such alternative of the equipment presented in FIGS. 4a–4c, in which the openings 15 are formed not only in the mantle of the tool 3, but in the stamp 1 as well. Here the stamp 1 is hollow and the openings 15 through an end plate 56 are interconnected with an internal cavity of the stamp 1. For discharge of the crumb rubber getting into the stamp 1, the stamp 1 is provided with outlet openings 57 intercommunicating with the cavity of stamp 1.

Finally FIGS. 6a and 6b as well as FIG. 7 show such embodiment of the rubber crushing equipment according to the invention, in which the pressure chamber is open. Such equipment is suitable for the crushing of lumpy scrap rubber not containing metal reinforcement.

According to FIGS. 6a and 6b the tool is formed as two counter-rotary drums 58 in contact with each other. In this embodiment a hopper 59 is arranged above the drums 58 to receive the lumpy scrap rubber 50. The drums 58 are hollow and the openings 15 are formed on the cylindrical mantle. The drums 58 are fixed on shafts 61 embedded in frame 60, and gears 62 engaged with each other are fixed on each shaft. The FIG. 6b shows that driving pulley 63 is fixed on one of the shafts 61, which is connected to a conventional drive (not shown).

The drums 58 are in positive coupling with each other. The counter-rotary drums 58 pulling the scrap rubber 50 into the narrowing hopper produce the pressure necessary for flow of the rubber. Thus this hopper is an open pressure chamber marked with reference number 7'. The openings 15 are of the same shape as before, and are arranged in such a way that the opening 15 of one of the drums in pressure chamber 7' should be in constant contact with the mantle of the other drum 58 (FIG. 6a). Furthermore the side plates of drums 58 are provided with outlet openings 57, through which the rubber fragments fall from the interior of the drums 58 into a collecting tray 66.

Very effective crushing can be accomplished with the embodiment of the equipment according to the invention shown in FIG. 7. This is actually an alternative of the solution described in connection with FIGS. 6a and 6b, with the difference that in this embodiment the external mantle of the two counter-rotary drums 58 is provided with longitudinal teeth 64. Here the openings 15 are always formed in tooth grooves 65. The pressure necessary for flow of the rubber is produced with the teeth 64 engaged with each other. The open pressure chamber is marked with reference number 7'.

Naturally the equipment according to the invention may have several other alternatives and combinations besides those described above. It is not necessary for the openings 15 to be tapered holes expanding outward, but they may be square or oblong holes as well. Similarly the pressure chamber may be formed in any other optional way. The openings 15 may be formed in any element surrounding the pressure chamber and in any shape, number and size. In addition, the equipment according to the invention can be constructed as a mobile equipment, with which the worn out tires, or other scrap rubber collected in the collecting places can be processed at the place of collection.

In the course of the experiments conducted with the embodiments of the equipment according to the invention described above, it was found that the proposed solution is considerably more economical for crushing of the scrap rubber with cold yield in a single process, at lower energy and cost, than any other conventional solution. Furthermore it is a significant advantage that the additional processes mainly for crushing of the tires, such as preliminary cutting and bead removal can be dispensed with, whereby further substantial cost can be saved.

The "scrap rubber" mentioned in the description and claims points includes all kind of scrap material derived in the course of rubber production from the raw rubber to the fully cured rubber.

Except in cases when "earthworm"-like product is obtained during crushing of the non-reticulated scrap rubber, as for instance in the case according to FIG.

4,-fragmentary rubber particles are obtained from the scrap rubber during crushing according to the invention, the grain size of which is identical with that of the openings 15. This crumb rubber can be graded in the conventional way, then may be used again. According to the experiments the crumb rubber obtained with crushing to 0.3 mm grain size can be directly used again in the rubber production. The same applies to the reticulated scrap rubber, e.g. to the "earthworm"-like product obtained at crushing of the raw rubber or semi-cured scrap rubber. The rubber grains over 0.3 mm size are effectively used as additive material for the industrial or agricultural flooring, or insulating pavement, sports ground pavement, or runway pavement of air fields.

We claim:

1. A process for crushing of scrap rubber, particularly tires, comprising: placing the rubber in a pressure chamber, pressing the rubber in a first direction in order to produce a high pressure on the rubber which brings about its cold yield, and forcing said rubber through yielding openings in a second direction transverse to said first direction so that second rubber is shredded as it flows through said yielding openings due to a sudden expansion following the high pressure caused by the shape of said yielding openings.

2. A process as claimed in claim 1, wherein the pressing of said rubber is carried out at a pressure of 12,800 psi–35,700 psi.

3. An apparatus for crushing a rubber tire, comprising: a tool having a cylindrical pressure chamber to receive a rubber tire to be crushed, a stamp axially displaceably arranged to move within said chamber and connected to a load applying means to produce a high pressure necessary to bring about cold yield of such a rubber tire, said chamber including a wall with a plurality of radial yielding openings reinforced to resist high pressures, a device for deforming such a rubber tire at its base ring and for moving it into said pressure chamber prior to crushing, said stamp pressing such a rubber tire through said yielding openings to shred such a rubber tire due to sudden expansion following the high pressure caused by the shape of said yielding openings.

4. An apparatus as claimed in claim 3, wherein said pressure chamber is surrounded by an ejecting unit arranged to be slideable in relation to the tool for removal of a remnant of the tire from the pressure chamber after crushing.

5. An apparatus as claimed in claim 3, wherein said tool has an upper part provided with an inlet cone for the tire to be crushed, said tool being seated on a supporting element having a hole formed as a cutting edge for coaction with a shoulder of said stamp formed as a stepped cylinder for cutting off base rings of the tire prior to crushing.

* * * * *